(12) United States Patent
Raju et al.

(10) Patent No.: US 11,354,329 B2
(45) Date of Patent: Jun. 7, 2022

(54) SYSTEMS FOR REAL-TIME MINING OF DATA IN TEST AND DEVELOPMENT ENVIRONMENTS

(71) Applicant: BANK OF AMERICA CORPORATION, Charlotte, NC (US)

(72) Inventors: Sujata Devon Raju, Frisco, TX (US); Vinod Kumar Alladi, Hyderabad (IN); Bhimeswar Rao Kharade Maratha, Charlotte, NC (US); Jayadev Mynampati, Hyderabad (IN); Parthiban Tiruvayur Shanmugam, Charlotte, NC (US); Durga Prasad Turaga, Murphy, TX (US); Karthik Kumar Venkatasubramanian, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 304 days.

(21) Appl. No.: 16/665,147

(22) Filed: Oct. 28, 2019

(65) Prior Publication Data

US 2021/0124750 A1    Apr. 29, 2021

(51) Int. Cl.
*G06F 16/00* (2019.01)
*G06F 16/25* (2019.01)
*G06F 16/2458* (2019.01)
*G06F 11/36* (2006.01)
*G06F 16/2455* (2019.01)

(52) U.S. Cl.
CPC ........ *G06F 16/254* (2019.01); *G06F 11/3664* (2013.01); *G06F 16/2465* (2019.01); *G06F 16/24552* (2019.01); *G06F 2216/03* (2013.01)

(58) Field of Classification Search
CPC .............. G06F 16/254; G06F 16/3664; G06F 16/24552; G06F 16/2465; G05F 2216/03
See application file for complete search history.

(56) References Cited

U.S. PATENT DOCUMENTS

| | | | | |
|---|---|---|---|---|
| 9,513,997 | B2* | 12/2016 | Moncelle | G06F 16/21 |
| 9,898,393 | B2* | 2/2018 | Moorthi | G06F 11/368 |
| 9,921,769 | B2* | 3/2018 | Aron | G06F 11/1451 |
| 11,294,929 | B1* | 4/2022 | Patil | G06F 16/275 |
| 2003/0061212 | A1* | 3/2003 | Smith | G06F 16/2453 |
| 2013/0063119 | A1* | 3/2013 | Lubomirsky | H02M 3/1563 |
| | | | | 323/304 |

(Continued)

*Primary Examiner* — Jean M Corrielus
(74) *Attorney, Agent, or Firm* — Moore & Van Allen PLLC; James C. Edwards

(57) ABSTRACT

A system for mining of real-time data from non-production environments (e.g., test and development environments). The data that is mined/extracted is "live" data that reflects instantaneous changes, modifications, to the data. In addition, since embodiments of the present invention provide users/testers with a "live" real-time view of the mined data, the data is stored in temporary storage/non-cache memory as opposed to permanent storage (i.e., cache memory). As a result, once the user/tester consumes the data (i.e., modifies, changes or otherwise conditions the data), the data is deleted from the temporary/non-cache storage location. Thus, embodiments of the invention eliminate the need to provide for and maintain a large database for permanent storage of mined test data.

18 Claims, 4 Drawing Sheets

(56) References Cited

U.S. PATENT DOCUMENTS

| | | | | |
|---|---|---|---|---|
| 2013/0311423 A1* | 11/2013 | Price | ............... | G06F 16/214 |
| | | | | 707/609 |
| 2015/0378828 A1* | 12/2015 | Moncelle | ............. | G06F 16/245 |
| | | | | 707/640 |
| 2017/0103103 A1* | 4/2017 | Nixon | ............. | G06F 16/2452 |
| 2018/0121339 A1* | 5/2018 | Mayers | ............. | G06F 11/3688 |
| 2019/0155805 A1* | 5/2019 | Kent, IV | ............. | G06F 40/18 |

* cited by examiner

```
┌─────────────────────────────────────────────────┐
│   RECEIVE A USER REQUEST THAT DEFINES A PLURALITY│
│   OF QUERIES FOR MINING DATA FROM AT LEAST ONE OF A│
│510│ PLURALITY OF NON-PRODUCTION APPLICATIONS CONFIGURED│
│   FOR TESTING AND/OR DEVELOPING SOFTWARE PRIOR  │
│   TO RELEASE AS A PRODUCTION APPLICATION        │
└─────────────────────────────────────────────────┘
                        │
                        ▼
┌─────────────────────────────────────────────────┐
│   IN RESPONSE TO RECEIVING THE REQUEST, EXECUTE │
│   THE PLURALITY OF QUERIES ACROSS THE ONE OR MORE│
│520│ OF THE NON-PRODUCTION APPLICATIONS INCLUDING │
│   (i) EXTRACTING REAL-TIME DATA FROM THE NON-PRODUCTION│
│   APPLICATIONS, AND (ii) TRANSFORMING THE EXTRACTED│
│   REAL-TIME DATA INTO AN INTEGRATED DATA SET    │
└─────────────────────────────────────────────────┘
                        │
                        ▼
┌─────────────────────────────────────────────────┐
│530│ RECEIVE AND STORE, IN A NON-CACHE MEMORY,   │
│        THE INTEGRATED DATA SET                  │
└─────────────────────────────────────────────────┘
                        │
                        ▼
┌─────────────────────────────────────────────────┐
│540│ PROVIDE A REAL-TIME VIEW OF THE             │
│        INTEGRATED DATA SET TO THE USER          │
└─────────────────────────────────────────────────┘
                        │
                        ▼
┌─────────────────────────────────────────────────┐
│   IN RESPONSE TO THE USER COMPLETING PROCESSING OF│
│550│ THE REAL-TIME DATA IN THE INTEGRATED DATA SET,│
│   DELETE A LOCAL COPY OF THE INTEGRATED DATA SET│
│        FROM THE NON-CACHE MEMORY                │
└─────────────────────────────────────────────────┘
```

FIG. 4

SYSTEMS FOR REAL-TIME MINING OF DATA IN TEST AND DEVELOPMENT ENVIRONMENTS

FIELD OF THE INVENTION

The present invention is generally related to data processing and, more specifically, mining/extraction of real-time data from non-production environments, such as software/code testing and development environments.

BACKGROUND

Many entities employ numerous software applications in the course of conducting the affairs of the entity. Typically, before a software application is elevated to an actual working status (otherwise referred to as "production" status or mode) or before revisions to production software applications are executed, a development and/or testing phase (i.e., "non-production" phase) is implemented to assure that the software application functions as designed once it enters the production phase.

Testing and/or development of software typically requires users, otherwise referred to as testers, to mine or otherwise extract data from the testing and development environment. For example, testers will input queries that define the parameters of the data which they desire to perform testing on and, in response to the queries, the data is mined/extracted. Once mined/extracted, the testers will modify, generate transactions or the like (collectively referred to as "conditioning" the data).

In current testing and development environments the data that is mined or extracted is a snapshot of the data stored in testing and development databases. These snapshots are refreshed on a daily basis, a weekly basis or the like. This means that the data that is being mined/extracted from the testing and/or development environment is not "live" data (otherwise referred to as "real-time" data), which would reflect changes, modifications, transactions as they occur to the data. Since the data that being tested is does not reflect the real-times changes in the data, the quality of the testing is diminished.

In addition, as testing/development requirements increase, the volume of testing and development applications increase, which place a burden on the storage requirements. Not only in terms of sheer size of the database required to store the snapshots, but also efficiency in accommodating changes to database schema and Extract, Transform and Load (ETL) jobs mandated by differences in new testing and development applications.

Therefore, a need exists to develop systems, methods, computer programs and the like that address the aforementioned problems. Specifically, the desired systems, methods, computer programs and the like should eliminate the use of data in the testing and development environment that is not current or "live". Further, the desired systems, methods, computer program products and the like should lessen the amount of resources needed to support the testing and production environment, specifically lessening the size of databases required to store snapshots of test and development data.

SUMMARY OF THE INVENTION

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by presenting systems, methods, computer program product and/or the like that provide for mining of real-time data from non-production environments (e.g., test and development environments). Thus, the data that is mined/extracted is "live" data that reflects instantaneous changes, modifications, to the data and/or transactions affecting the data. As a result, the testing that is performed on the "live" data is more robust and of a higher quality than testing that would be performed on conventionally mined data (i.e., snapshot data that is only refreshed at specified intervals, such as daily, weekly or the like).

In addition, since embodiments of the present invention provide users/testers with a "live" real-time view of the mined data, there is no need to store the data locally in permanent (i.e., cache memory) storage. As a result, once the user/tester consumes the data (i.e., modifies, changes or otherwise conditions the data), the data is deleted from the temporary/non-cache storage location. Thus, embodiments of the invention eliminate the need to provide for and maintain a large database for permanent storage of mined test data.

A system for mining of real-time data from testing and development environments defines first embodiments of the invention. The system includes a plurality of non-production applications configured for, at least one of, testing and developing of code prior to potential release as a production application. The system additionally includes a computing platform in network communication (e.g., Internet and/or intranet or the like) with the non-production applications. The computing platform includes a memory and at least one processor in communication with the memory. The memory stores instructions that are executable by the at least one processor> The instructions are configured to receive a request from a user that defines a plurality of queries for mining data from the plurality of non-productions applications. The instructions are further configured to, in response to receiving the request, execute the plurality queries across one or more of the non-production applications. Executing the plurality of queries includes (i) extracting real-time data from the one or more non-production applications, and (ii) transforming the extracted real-time data into an integrated data set. Further, the instructions are configured to receive and store, in a non-cache memory, the integrated data set as a local copy, and provide a real-time view of the integrated data set to the user.

In specific embodiments of the system, the instructions are further configured to, in response to the user completing processing of the real-time data in the integrated data set, delete the local copy of the integrated data set from the non-cache memory.

In further specific embodiments of the system, the instructions are further configured to execute the plurality of queries by generating one or more shell scripts that include requirements for performing the plurality of queries and that trigger the extraction of the real-time data from the one or more non-production applications.

In still further specific embodiments of the system, the instructions are further configured to execute the plurality of queries, in parallel, to extract the real-time data from a plurality of the non-production applications. The plurality of non-production applications have heterogenous databases.

In additional specific embodiments of the system, the instructions for executing the plurality of queries include (i) extracting real-time data from the one or more non-production applications by loading metadata from data elements in the one or more non-production applications that are responsive to at least one of the queries. In such embodiments of the system, the instructions for executing the plurality of queries include (ii) transforming the extracted real-time data into an integrated data set, which consists solely of the metadata from the data elements.

Moreover, in further specific embodiments of the system, the instructions are further configured to store, in cache memory, one or more reservations associated with the extracted real-time data, wherein the reservations provide for the extracted real-time data to be processed only by the user for a duration of the reservation. In such embodiments of the system, the reservation is associated with at least one of (i) a user associated with the extracted real-time data, and (ii) resource depository associated with the extracted real-time data.

A computer-implemented method for mining of real-time data from testing and development environments defines second embodiments of the invention. The method is implemented by one or more processing devices. The method includes receiving a request from a user that defines a plurality of queries for mining data from at least one of a plurality of non-productions applications. The non-production applications are configured for, at least one of, testing and developing code prior to potential release as a production application. In addition, the method includes, in response to receiving the request, executing the plurality queries across one or more of the non-production applications. Executing the plurality of queries includes (i) extracting real-time data from the one or more non-production applications, and (ii) transforming the extracted real-time data into an integrated data set. Further, the method includes receiving and storing, in a non-cache memory, the integrated data set as a local copy, and providing a real-time view of the integrated data set to the user.

In specific embodiments the method further includes, in response to the user completing processing of the real-time data in the integrated data set, deleting the local copy of the integrated data set from the non-cache memory.

In still further specific embodiments of the method, executing the plurality of queries further includes generating one or more shell scripts that (i) include requirements for performing the plurality of queries and (ii) trigger the extraction of the real-time data from the one or more non-production applications.

In additional specific embodiments of the method, executing the plurality of queries further includes executing the plurality of queries, in parallel, to extract the real-time data from a plurality of the non-production applications. The plurality of non-production applications have heterogenous databases.

In yet further specific embodiments of the method, executing the plurality of queries includes (i) extracting real-time data from the one or more non-production applications by loading metadata from data elements in the one or more non-production applications that are responsive to at least one of the queries. In such embodiments of the method, executing the plurality of queries includes (ii) transforming the extracted real-time data into an integrated data set, which consists solely of the metadata from the data elements.

Moreover, in additional specific embodiments the method includes storing, in cache memory, one or more reservations associated with the extracted real-time data, wherein the reservations provide for the extracted real-time data to be processed only by the user for a duration of the reservation. In such embodiments of the method, storing, in cache memory, the one or more reservations further includes storing, in cache memory, the one or more reservations associated with at least one of (i) a user associated with the extracted real-time data, and (ii) resource depository associated with the extracted real-time data.

A computer program product including a non-transitory computer-readable medium defines third embodiments of the invention. The computer-readable medium includes a first set of codes for causing a computer to receive a request from a user that defines a plurality of queries for mining data from at least one of a plurality of non-productions applications. The the non-production applications are configured for, at least one of, testing and developing code prior to potential release as a production application. The computer-readable medium additionally includes a second set of codes for causing a computer to, in response to receiving the request, execute the plurality queries across one or more of the non-production applications. Executing the plurality of queries includes (i) extracting real-time data from the one or more non-production applications, and (ii) transforming the extracted real-time data into an integrated data set. Additionally, the computer-readable medium includes a third set of codes for causing a computer to, receive and store, in a non-cache memory, the integrated data set as a local copy; and a fourth set of codes for causing a computer to provide a real-time view of the integrated data set to the user.

In specific embodiment of the computer program product, the computer-readable medium further comprises a fifth set of codes for causing a computer to, in response to the user completing processing of the real-time data in the integrated data set, deleting the local copy of the integrated data set from the non-cache memory.

In other specific embodiments of the computer program product, the second set of codes is further configured to generate one or more shell scripts that (i) include requirements for performing the plurality of queries, and (ii) trigger the extraction of the real-time data from the one or more non-production applications.

In still further specific embodiments of the computer program product, the second set of codes is further configured to execute the plurality of queries (i) in parallel, to extract the real-time data from a plurality of the non-production applications, wherein the plurality of non-production applications have heterogenous databases, and (ii) by loading metadata from data elements in the one or more non-production applications that are responsive to at least one of the queries.

Thus, according to embodiments of the invention, which will be discussed in greater detail below, the present invention provides for mining of real-time data from non-production environments (e.g., test and development environments), meaning the data that is mined/extracted is "live" data that reflects instantaneous changes, modifications, to the data and/or transactions affecting the data. In addition, since embodiments of the present invention provide users/testers with a "live" real-time view of the mined data, there is no need to store the data locally in permanent (i.e., cache memory) storage. As a result, once the user/tester consumes the data (i.e., modifies, changes or otherwise conditions the data), the data is deleted from the temporary/non-cache storage location. Thus, embodiments of the invention eliminate the need to provide for and maintain a large database for permanent storage of mined test data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
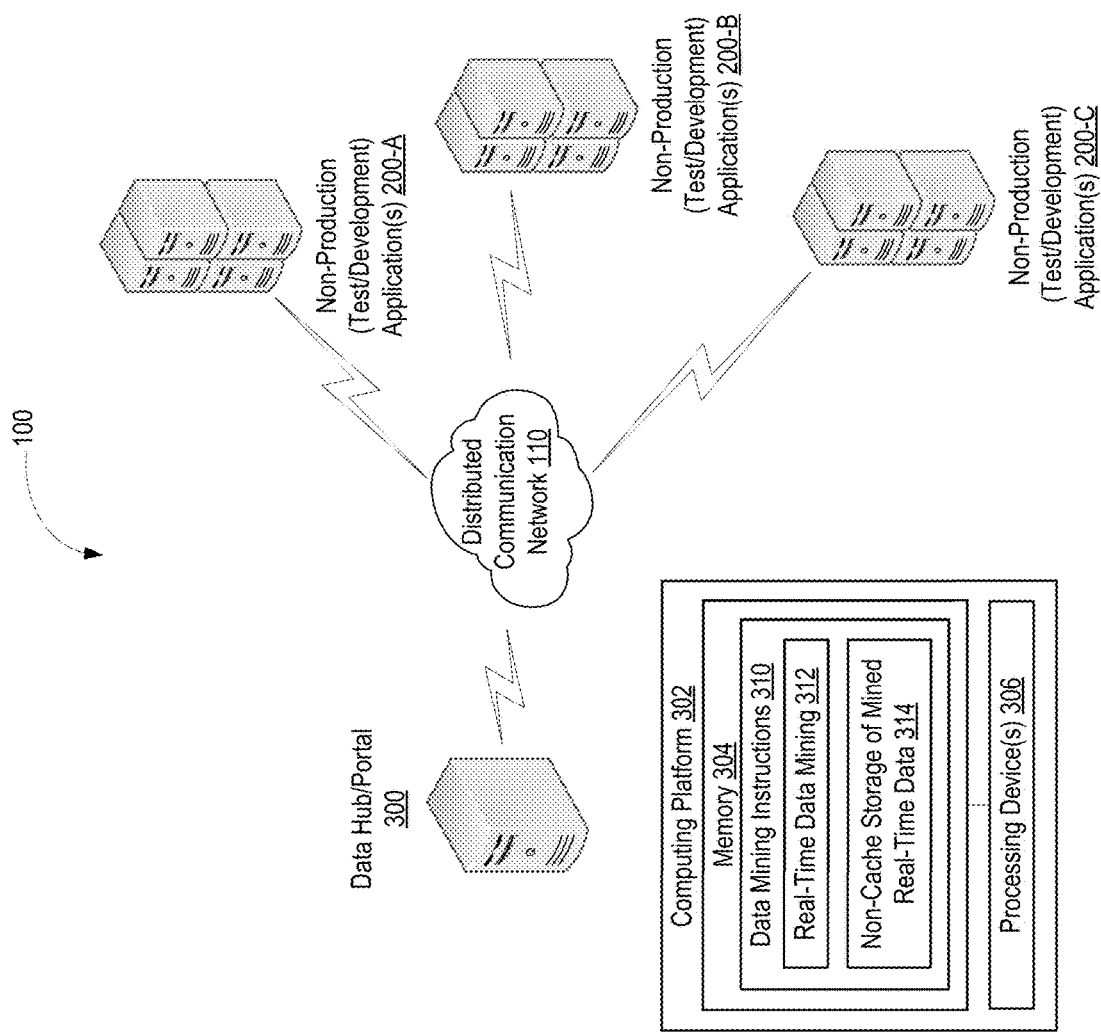
Figure 2:
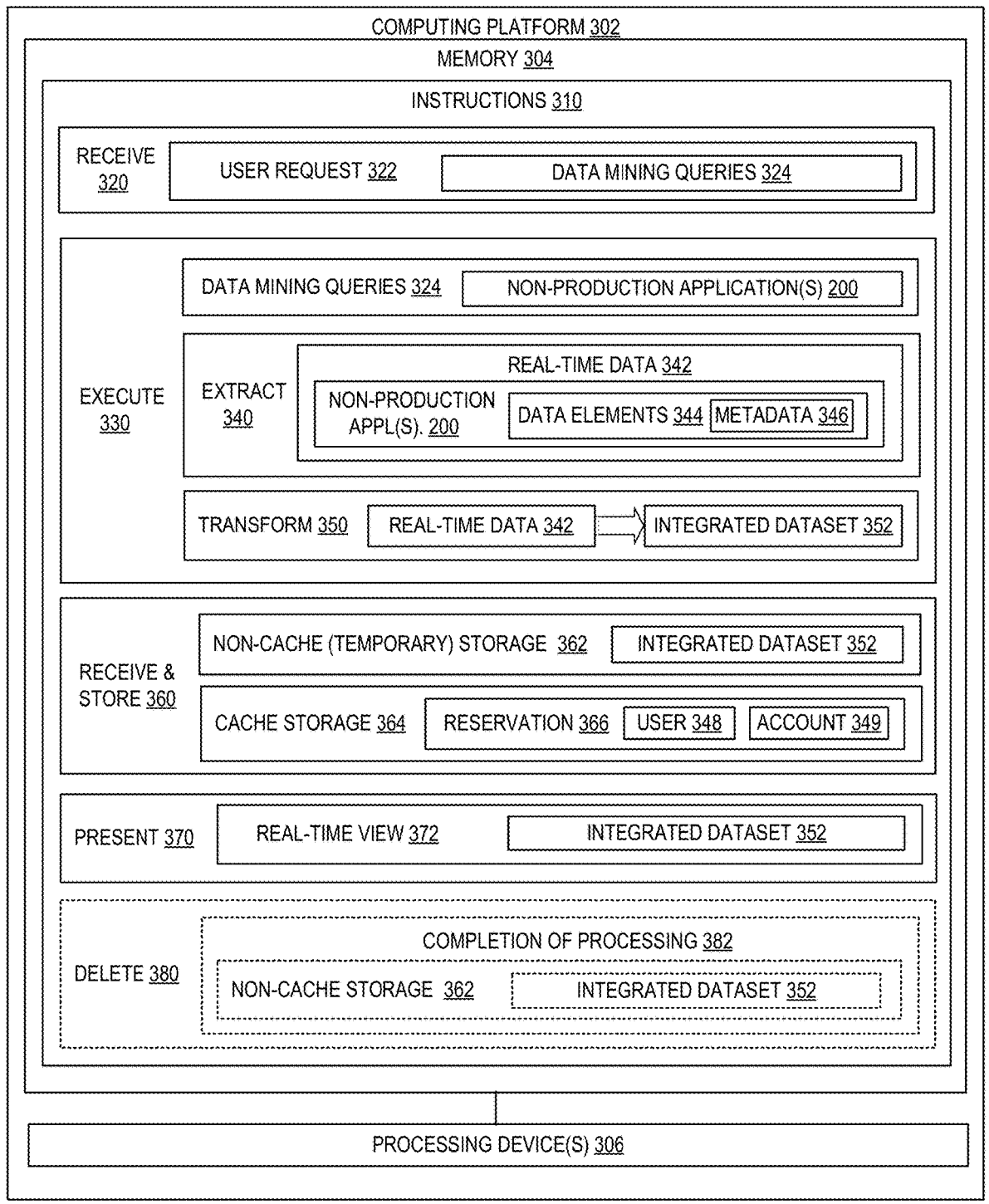
Figure 3:
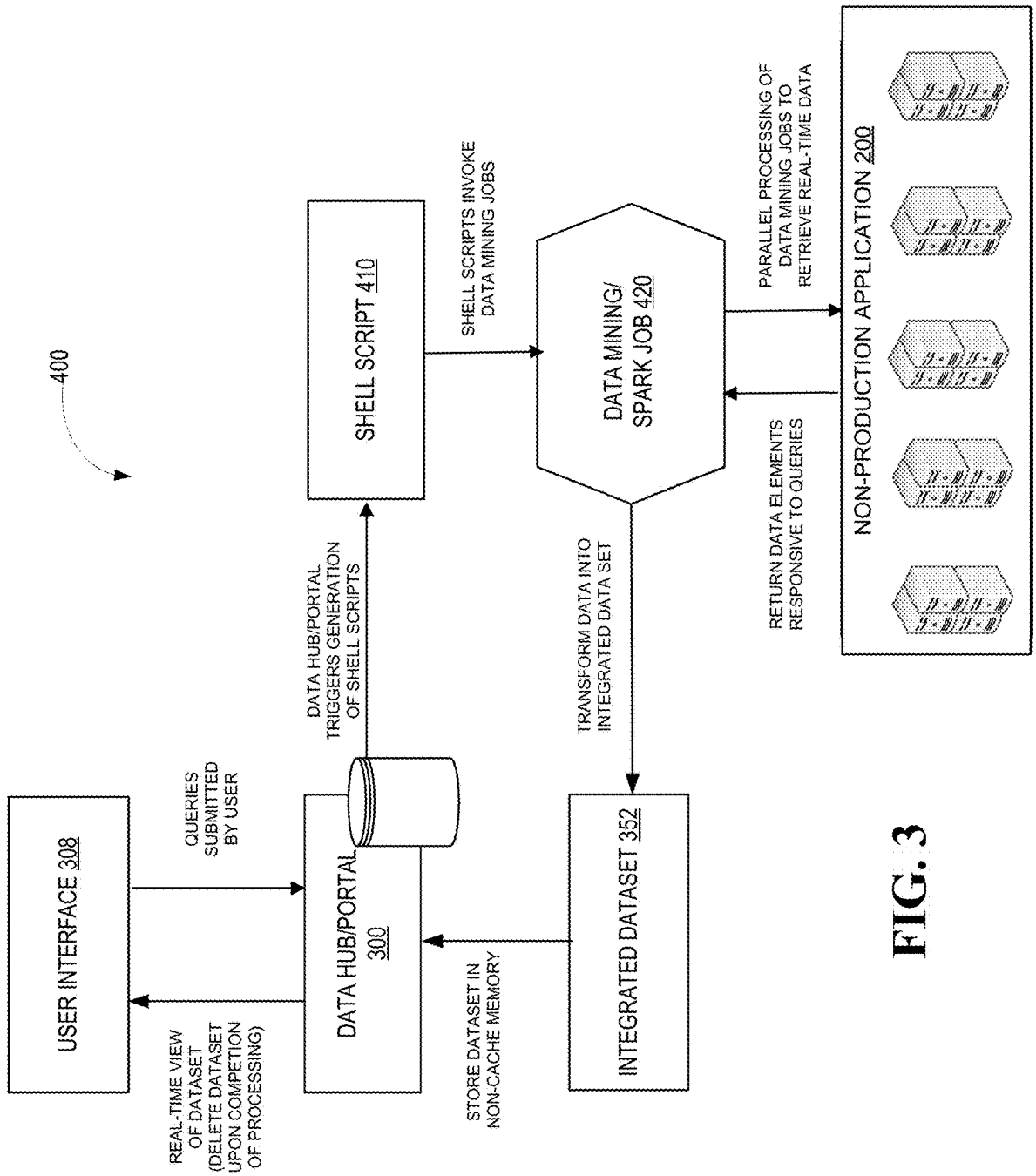

Having thus described embodiments of the disclosure in general terms, reference will now be made to the accompanying drawings, wherein:

FIG. 1 is a schematic diagram of a system for online mining of real-data from non-production applications, in accordance with embodiments of the present invention;

FIG. 2 is a block diagram of a computing platform configured for online mining of real-data from non-production applications, in accordance with some embodiments of the present disclosure;

FIG. 3 is a schematic and flow diagram illustrating methodology for online mining of real-time data from non-production applications, in accordance with embodiment of the present invention; and FIG. 4 is a flow diagram of a method for online mining of real-data from non-production applications, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, as described in greater detail below, embodiments of the invention provide for mining of real-time data from non-production environments (e.g., test and development environments). The data that is mined/extracted is "live" data that reflects real-time/instantaneous changes, modifications, to the data and/or transactions affecting the data. As a result, the testing that is performed on the "live" data is more robust and of a higher quality than testing that would be performed on conventionally mined data (i.e., snapshot data that is only refreshed at specified intervals, such as daily, weekly or the like).

In addition, since embodiments of the present invention provide users/testers with a "live" real-time view of the mined data, there is no need to store the data locally in permanent (i.e., cache memory) storage. As a result, once the user/tester consumes the data (i.e., modifies, changes or otherwise conditions the data), the data is deleted from the temporary/non-cache storage location. Thus, embodiments of the invention eliminate the need to provide for and maintain a large database for permanent storage of mined test data.

Turning now to the figures, FIG. 1 a schematic diagram is provided of system 100 for online mining of data from non-production applications, in accordance with embodiments of the present invention. The system 100 includes a plurality of disparate non-productions applications 200-A, 200-B, 200-C that are executed, as shown, on applications servers or, in other embodiments of the invention, may be executed on any other known or future known computing apparatus/device. In specific embodiments of the invention, the non-productions applications 200-A, 200-B, 200-C are testing and/or development applications configured for testing and/or developing software code prior to release of the application into a production environment. In this regard, the testing/development applications are implemented in an environment that is intended to mirror the production environment.

The system 100 additionally includes a data hub/portal 300 that is executed, as shown, on server(s) or, in other embodiments of the invention, may be executed on any other known or future known computing apparatus/device(s). The data hub/portal is in network communication with the plurality of non-production applications 200-A, 200-B, 200-C via distributed communication network 110, which may be a public network, such as the Internet, a private network or a combination of public and private networks. The data hub/portal includes a computing platform 302 having a memory 304 and at least one processing device 306 in communication with the memory 404. The memory stores data mining instructions 310, which are executable by the processing device(s) 306 and configured to provide for real-time data mining 312 within the non-production applications 200-A, 200-B, 200-C. In testing/development environment users "mine" (i.e., extract) data from the test and/or development applications 200-A, 200-B, 200-C and perform processing on the data (i.e., conduct transactions or the like) as part of the testing/development process. The data that is being mined/extracted from the test/development applications 200-A, 200-B, 200-C is dynamic data that changes over time.

Heretofore, the mining of data from the test/development applications has been from "snapshots" (i.e., a data file that captures the data from the applications at a specified point in time). Conventionally, "snapshots" are generated at pre-scribed intervals, such as daily, weekly or the like, as such, the data that is being mined is not the data currently existing in the test/development environment, but rather is archaic data. In order for users/testers to insure the integrity and accuracy of the processing performed on the mined data, it is desirable to perform such processing on "live" data, i.e., real-time data that reflects the dynamic changes to the data occurring in the testing and/or development applications.

Further, the instructions 310 are configured for non-cache (i.e., temporary) storage 314 of the mined real-time data. In this regard, the data that is mined is never held in cache (i.e., permanent) storage. The user of the data is presented with a real-time view of the data and, in response to the user completing the requisite processing of the data, the data is deleted from the temporary storage/memory. As previously discussed, heretofore the mining of data from the test/development applications has been from "snapshots", which are large data files that require an ample amount of storage capacity. By providing for real-time data mining, the data is not required to be permanently stored in cache memory and, thus, the present invention provides the technical effect of limiting the consumption of resources (i.e., memory/storage and the like).

Referring to FIG. 2 a block diagram is presented of the computing platform 302 configured to perform online mining of real-time data for non-production applications, in accordance with embodiments of the present invention. The computing platform 302 is disposed in the distributed communication network 110 (shown in FIG. 1) and may comprise one or more computing devices (e.g., servers, computing devices, or the like). The computing platform 302 s configured to execute algorithms, modules, routines, applications, such as data mining applications 310. Computing platform 302 includes memory 304, which may comprise volatile (i.e., temporary) and non-volatile (i.e., permanent) memory, such as read-only and/or random-access memory (RAM and ROM), EPROM, EEPROM, flash cards, or any memory common to computing platforms). Moreover, memory 310 may comprise cloud storage, such as provided by a cloud storage service and/or a cloud connection service.

Further, computing platform 300 also includes at least one processing device 306, which may be an application-specific integrated circuit ("ASIC"), or other chipset, logic circuit, or other data processing device. Processing device(s) 306 may execute one or more application programming interface (APIs) (not shown in FIG. 2) that interface with any resident programs, such as data mining instructions 310 or the like, stored in the memory 304 of the computing platform 302 and any external programs. Processing devices(s) 306 may include various processing subsystems (not shown in FIG. 2) embodied in hardware, firmware, software, and combinations thereof, that enable the functionality of the computing platform 302 and the operability of the computing platform 302 on the distributed communication network 110 (shown in FIG. 1). For example, processing subsystems allow for initiating and maintaining communications and exchanging data with other networked devices, such as devices executing non-production applications 200 (shown in FIG. 1). For the disclosed aspects, processing subsystems of processing device 306 may include any subsystem used in conjunction with data mining instructions 310 and related tools, routines, sub-routines, algorithms, sub-algorithms, sub-modules thereof.

Computing platform 302 may additionally include a communications module (not shown in FIG. 2) embodied in hardware, firmware, software, and combinations thereof, that enables electronic communications between the computing platform 302 and other network devices, such as devices executing non-production application 200 (shown in FIG. 1). Thus, communication module may include the requisite hardware, firmware, software and/or combinations thereof for establishing and maintaining a network communication connection with one or more network devices.

Memory 304 of computing platform 300 stores a data mining instructions 310 that are executable by the processing device(s) 306. In specific embodiments of the invention the instructions 310 are configured to receive 320 user requests 322 that define data mining queries 324 for mining data from one or more of the non-production applications 200. The queries 324 define the criteria for the data that the user desires to mine/extract from the non-production applications 200. For example, in a financial institution environment the queries may define that the user desires a specific type of mortgage loan, with a specified balance and a specified loan balance. In specific embodiments of the invention, the user requests 322 may be received and online data mining may be performed at data hub/portal 300 (shown in FIG. 1), while in other embodiments of the invention, the user requests 322 may be received and online data mining may be performed via a standalone application/module or the like.

In response to receiving the user requests 322, the instructions 310 are further configured to execute 330 the queries 324 across the non-production applications 200. Execution 330 of the data mining queries 324 includes extracting 340 real-time data 342 from the non-productions applications 200. In specific embodiments of the invention, extraction 340 includes extracting the metadata 346 from data elements 344 that are responsive to the queries 324. Execution 330 further includes transforming 350 the real-time data 342 to an integrated dataset 352, which may include extracting the metadata 346 from the data elements and reformatting the metadata 346 as required based on the disparate nature of the non-production applications (e.g., different operating systems, different applications types, different data formatting and the like).

As will be discussed further in relation to FIG. 3, execution of the queries 324 may include triggering generation of one or more shell scripts which include the queries 324 and invoke data mining jobs. In specific embodiments of the invention, the data mining jobs are Spark jobs executed in accordance with Apache Spark, which is an open-source unified analytics engine for large-scale data processing. The data mining jobs, such as Spark jobs are configured to execute the queries 324, in parallel, across all available non-production applications 200 regardless of application type, operating system or the like. The data mining jobs are configured to retrieve the data elements 344 responsive to the queries 324 and transform/compile the data into one integrated dataset 352 including extracting metadata 346.

Instructions 310 are further configured to receive and store the integrated dataset 352 in non-cache (i.e., temporary) memory/storage 362 and present 370, to the user, a real-time view 372 of the dataset 352 for use of the data by the user (i.e., performing necessary functions on the data as required by the user, including modify/alter the data, generate transactions or the like, collectively referred to as "conditioning" the data). This means that unlike previous "snapshot" files of test/development data, the dataset 352 is not stored locally in permanent/cache storage, such as database or the like. Since the dataset 352 is not stored in a permanent storage, once completion of processing 382 of the data has occurred, the instructions 310, in specific embodiments of the invention, are configured to delete 380 the dataset 352 from the non-cache (temporary) memory/storage 362.

While the dataset 352 is not subjected to cache/permanent memory, the instructions 310 are further configured to store a data reservation 366 in cache/permanent storage 364. The data reservation 366 reserves the data, specifically, the user 348 to whom the data is associated and/or the account 349 to which the data is associated for the predetermined duration of the reservation. This means that during the life of the reservation 366, the user/tester using the data has ownership of the data (i.e., the user/tester is the only individual who may use the data during the period of reservation).

Referring to FIG. 3, a combination schematic and flow diagram is depicted detailing the methodology 400 for online data mining of real-time data from non-production applications, in accordance with embodiments of the present invention. At user interface 308, which may be provided via data hub/portal 300 or any other application module, a user enters a data request that defines a plurality of queries for data to be mined/extracted from non-production applications 200. In response to receipt of the user requests, the data hub/portal 300 or other application/module triggers generation of shell scripts 410, which include the data mining requirements (i.e., the queries).

The shell scripts 410 invoke the data mining jobs 420, which, as previously discussed may be Spark jobs or the like. The data mining jobs 420 are configured to be executed, in parallel, across all of the operational non-production applications, such as, all of the operational testing/development applications regardless of application type, operating system/platform or the like. The data mining jobs 420 are configured to return those data elements within non-production applications that are responsive to one or more of the queries. The data elements are subsequently transformed into an integrated data set 352 including extracting metadata from the data elements. As previously discussed, transformation may include reformatting the metadata into a unified format.

Once the integrated dataset 352 has been generated and received by the data hub/portal 300, the dataset is stored in non-cache/temporary storage (i.e., data is read directly from the non-production applications) and a real-time view of the dataset is presented to the user/tester via user interface 308. As previously discussed, while the data itself is not stored in a database or any other permanent storage location, a reservation for the data is stored in cache/permanent storage and indicates that the data (e.g., user tied to the data and/or account tied to the data) is reserved for use by the user/tester for a predetermined period of time. Once the user/tester has completed conditioning of the data (e.g., modified the data, generated transactions from the data or the like), the dataset is deleted from the temporary storage.

Referring to FIG. 4 a flow diagram is depicted of a method 500 for online mining of real-time data from non-production applications, in accordance with embodiments of the present invention. At Event 510, a user is request is received that defines a plurality of queries for mining/extracting data from a plurality of non-production applications configured for testing/development prior to potential release as a production application.

At Event 520, in response to receiving the request, the plurality of queries are executed across the non-production applications. Execution includes extracting real-data/dynamic from the operational non-production. Such extraction may occur by conducting data mining jobs, such as Spark jobs or the like, in parallel, across all of the operational non-production applications. Parallel processing provides for faster and more efficient mining of the data, in that, the queries are not applied to the non-production applications in sequence. The data mining jobs may be invoked by shell scripts that include the queries. In such embodiments of the method, the data mining jobs may extract the data elements that are responsive to one or more of the queries. Execution further includes transforming/reformatting the metadata into an integrated dataset, including extracting metadata from the data elements.

At Event 530, the integrated dataset is received and stored in a non-cache memory (i.e., read directly from the non-production applications) and, at Event 540, a real-time view of the dataset is presented to the user/tester for subsequent conditioning of the data by the user/tester. At Event 540, in response to the user completing processing/conditioning of the real-time data in the integrated dataset, the dataset is deleted/removed from the non-cache storage.

Thus, the present invention provides for mining of real-time data from non-production environments (e.g., test and development environments), meaning the data that is mined/extracted is "live" data that reflects instantaneous changes, modifications, to the data and/or transactions affecting the data. In addition, since embodiments of the present invention provide users/testers with a "live" real-time view of the mined data, there is no need to store the data locally in permanent (i.e., cache memory) storage. As a result, once the user/tester consumes the data (i.e., modifies, changes or otherwise conditions the data), the data is deleted from the temporary/non-cache storage location. Thus, embodiments of the invention eliminate the need to provide for and maintain a large database for permanent storage of mined test data. The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mining of real-time data from testing and development environments, the system comprising:
    a plurality of non-production applications configured for, at least one of, testing and developing prior to potential release as a production application; and
    a computing platform in network communication with the non-production applications and including a memory and at least one processor in communication with the memory, wherein the memory stores instructions that are executable by the at least one processor and configured to:
        receive a request from a user that defines a plurality of queries for mining data from one or more of the plurality of non-productions applications;
        in response to receiving the request, execute the plurality queries across the one or more of the non-production applications, wherein executing the plurality of queries includes (i) extracting real-time data from the one or more non-production applications, and (ii) transforming the extracted real-time data into an integrated data set,
        store, in cache memory, one or more reservations associated with the extracted real-time data, wherein the reservations provide for the extracted real-time data to be processed only by the user for a duration of the reservation,
        receive and store, only in a non-cache memory, the integrated data set as a local copy,
        and
        provide a real-time view of the integrated data set to the user.

2. The system of claim 1, wherein the instructions are further configured to, in response to the user completing processing of the real-time data in the integrated data set, delete a local copy of the integrated data set from the non-cache memory.

3. The system of claim 1, wherein the instructions are further configured to execute the plurality of queries by generating one or more shell scripts that include requirements for performing the plurality of queries and trigger the extraction of the real-time data from the one or more non-production applications.

4. The system of claim 1, wherein the instructions are further configured to execute the plurality of queries, in parallel, to extract the real-time data from a plurality of the non-production applications, wherein the plurality of non-production applications have heterogenous databases.

5. The system of claim 1, wherein the instructions for executing the plurality of queries include (i) extracting real-time data from the one or more non-production applications by loading metadata from data elements in the one or more non-production applications that are responsive to at least one of the queries.

6. The system of claim 5, wherein the instructions for executing the plurality of queries include (ii) transforming the extracted real-time data into an integrated data set, wherein the integrated data set consists solely of the metadata from the data elements.

7. The system of claim 1 wherein the reservation is associated with at least one of (i) a user associated with the extracted real-time data, and (ii) resource depository associated with the extracted real-time data.

8. A computer-implemented method for mining of real-time data from testing and development environments, the method implemented by one or more processing devices and including:
    receiving a request from a user that defines a plurality of queries for mining data from one or more of a plurality of non-productions applications, wherein the non-production applications are configured for, at least one of, testing and developing prior to potential release as a production application;
    in response to receiving the request, executing the plurality queries across the one or more of the non-production applications, wherein executing the plurality of queries includes (i) extracting real-time data from the one or more non-production applications, and (ii) transforming the extracted real-time data into an integrated data set;
    storing, in cache memory, one or more reservations associated with the extracted real-time data, wherein the reservations provide for the extracted real-time data to be processed only by the user for a duration of the reservation;
    receiving and storing, only in a non-cache memory, the integrated data set as a local copy; and
    providing a real-time view of the integrated data set to the user.

9. The computer-implemented method of claim 8, further comprising, in response to the user completing processing of the real-time data in the integrated data set, deleting a local copy of the integrated data set from the non-cache memory.

10. The computer-implemented method of claim 8, wherein executing the plurality of queries further comprises generating one or more shell scripts that (i) include requirements for performing the plurality of queries, and (ii) trigger the extraction of the real-time data from the one or more non-production applications.

11. The computer-implemented method of claim 8, wherein executing the plurality of queries further comprises executing the plurality of queries, in parallel, to extract the real-time data from a plurality of the non-production applications, wherein the plurality of non-production applications have heterogenous databases.

12. The computer-implemented method of claim 8, wherein executing the plurality of queries includes (i) extracting real-time data from the one or more non-production applications by loading metadata from data elements in the one or more non-production applications that are responsive to at least one of the queries.

13. The computer-implemented method of claim 12, wherein executing the plurality of queries includes (ii) transforming the extracted real-time data into an integrated data set, wherein the integrated data set consists solely of the metadata from the data elements.

14. The computer-implemented method of claim 8, wherein storing, in cache memory, the one or more reservations further comprises storing, in cache memory, the one or more reservations associated with at least one of (i) a user associated with the extracted real-time data, and (ii) resource depository associated with the extracted real-time data.

15. A computer program product comprising:
   a non-transitory computer-readable medium comprising:
   a first set of codes for causing a computer to receive a request from a user that defines a plurality of queries for mining data from one or more of a plurality of non-productions applications, wherein the non-production applications are configured for, at least one of, testing and developing prior to potential release as a production application;
   a second set of codes for causing a computer to, in response to receiving the request, execute the plurality queries across the one or more of the non-production applications, wherein executing the plurality of queries includes (i) extracting real-time data from the one or more non-production applications, and (ii) transforming the extracted real-time data into an integrated data set;
   a third set of codes for causing a computer to store, in cache memory, one or more reservations associated with the extracted real-time data, wherein the reservations provide for the extracted real-time data to be processed only by the user for a duration of the reservation;
   a fourth set of codes for causing a computer to, receive and store, only in a non-cache memory, the integrated data set as a local copy; and
   a fifth set of codes for causing a computer to provide a real-time view of the integrated data set to the user.

16. The computer program product of claim 15, wherein the computer-readable medium further comprises a sixth set of codes for causing a computer to, in response to the user completing processing of the real-time data in the integrated data set, deleting a local copy of the integrated data set from the non-cache memory.

17. The computer program product of claim 15, wherein the second set of codes is further configured to generate one or more shell scripts that (i) include requirements for performing the plurality of queries, and (ii) trigger the extraction of the real-time data from the one or more non-production applications.

18. The computer program product of claim 15, wherein the second set of codes is further configured to execute the plurality of queries (i) in parallel, to extract the real-time data from a plurality of the non-production applications, wherein the plurality of non-production applications have heterogenous databases, and (ii) by loading metadata from data elements in the one or more non-production applications that are responsive to at least one of the queries.

\* \* \* \* \*